(12) United States Patent
Gelinas et al.

(10) Patent No.: US 11,625,629 B2
(45) Date of Patent: Apr. 11, 2023

(54) SYSTEMS AND METHODS FOR PREDICTING USER BEHAVIOR BASED ON LOCATION DATA

(71) Applicant: Axon Vibe AG, Lucerne (CH)

(72) Inventors: Simon Gelinas, Brooklyn, NY (US); Ryan Vilim, Brooklyn, NY (US); Katherine Yoshida, New York, NY (US); Jacopo Tagliabue, New York, NY (US); Michael Murphy, Norwich (GB); Roman Oberli, Sarnen (CH); Thomas Annicq, New York, NY (US)

(73) Assignee: AXON VIBE AG, Lucerne (CH)

( * ) Notice: Subject to any disclaimer, the term of this patent is extended or adjusted under 35 U.S.C. 154(b) by 448 days.

(21) Appl. No.: 15/449,550

(22) Filed: Mar. 3, 2017

(65) Prior Publication Data

US 2017/0255868 A1    Sep. 7, 2017

Related U.S. Application Data

(60) Provisional application No. 62/303,909, filed on Mar. 4, 2016.

(51) Int. Cl.
*G06N 5/04* (2006.01)
*H04W 4/029* (2018.01)
(Continued)

(52) U.S. Cl.
CPC ............ *G06N 5/047* (2013.01); *G06N 7/005* (2013.01); *G06N 20/00* (2019.01); *H04W 4/02* (2013.01); *H04W 4/029* (2018.02)

(58) Field of Classification Search
CPC ........ G06N 5/047; G06N 7/005; G06N 20/00; H04W 4/029; H04W 4/02
See application file for complete search history.

(56) References Cited

U.S. PATENT DOCUMENTS

| 8,321,527 B2 | 11/2012 | Martin et al. |
| 8,401,923 B1 | 3/2013 | Lester et al. |

(Continued)

FOREIGN PATENT DOCUMENTS

| CN | 105072591 A | 11/2015 |
| RU | 2013141052 A | 4/2015 |

(Continued)

OTHER PUBLICATIONS

Ying Huang, Tahar Kechadi, "An effective hybrid learning system for telecommunication churn prediction", Expert Systems with Applications 40, 2013, pp. 5635-5647. (Year: 2013).*

(Continued)

*Primary Examiner* — Miranda M Huang
*Assistant Examiner* — Yao David Huang
(74) *Attorney, Agent, or Firm* — Wilmer Cutler Pickering Hale and Dorr LLP (57) ABSTRACT

Systems and computerized methods for determining patterns in user activity such that user contextual information can be provided based on the patterns. Historic data associated with a first user is received and entity information is determined based on the historic data. Current location data associated with the first user is received and prediction information is generated based on a combination of the entity information and the current location data for a current time period. Contextual insight information is determined based on a combination of the prediction information with at least one of the current location data, real time data, and contextual data, the contextual insight information including a recommendation of at least one of an activity, a purchase, and an accessory associated with the current location of the first user.

9 Claims, 8 Drawing Sheets

(51) Int. Cl.
*G06N 20/00* (2019.01)
*H04W 4/02* (2018.01)
*G06N 7/00* (2006.01)
*G06N 5/047* (2023.01)

(56) References Cited

U.S. PATENT DOCUMENTS

| | | | |
|---|---|---|---|
| 8,843,951 B1 | 9/2014 | Sherrets et al. | |
| 8,943,126 B1* | 1/2015 | Feldman | H04W 4/029 |
| | | | 709/205 |
| 9,088,532 B1* | 7/2015 | Dorsey | H04L 51/046 |
| 9,247,020 B2 | 1/2016 | Dollard | |
| 9,382,055 B2 | 7/2016 | Dziuk et al. | |
| 9,710,821 B2 | 7/2017 | Heath | |
| 9,747,285 B1 | 8/2017 | Laufer | |
| 9,799,020 B2 | 10/2017 | Howe et al. | |
| 9,799,034 B1 | 10/2017 | Varma et al. | |
| 9,959,529 B1 | 5/2018 | Varma et al. | |
| 10,068,272 B1 | 9/2018 | Varma et al. | |
| 2006/0149684 A1 | 7/2006 | Matsuura et al. | |
| 2007/0100651 A1 | 5/2007 | Ramer et al. | |
| 2008/0059207 A1 | 3/2008 | Belimpasakis | |
| 2009/0125321 A1 | 5/2009 | Charlebois et al. | |
| 2009/0240647 A1 | 9/2009 | Green et al. | |
| 2010/0169134 A1 | 7/2010 | Cheng et al. | |
| 2010/0262487 A1* | 10/2010 | Edwards | G06Q 30/02 |
| | | | 705/14.43 |
| 2011/0166936 A1* | 7/2011 | Dixon | G06Q 30/0261 |
| | | | 705/14.58 |
| 2011/0238514 A1 | 9/2011 | Ramalingam et al. | |
| 2012/0047102 A1 | 2/2012 | Petersen et al. | |
| 2012/0054180 A1 | 3/2012 | Priyadarshan et al. | |
| 2012/0095862 A1 | 4/2012 | Schiff et al. | |
| 2012/0137367 A1 | 5/2012 | Dupont et al. | |
| 2012/0190386 A1 | 7/2012 | Anderson | |
| 2012/0239479 A1 | 9/2012 | Amaro et al. | |
| 2013/0024471 A1 | 1/2013 | Mitrovic | |
| 2013/0030964 A1 | 1/2013 | Nuzzi et al. | |
| 2013/0073336 A1 | 3/2013 | Heath | |
| 2013/0073389 A1 | 3/2013 | Heath | |
| 2013/0080523 A1 | 3/2013 | Rubinstein et al. | |
| 2013/0102283 A1 | 4/2013 | Lau et al. | |
| 2013/0185123 A1 | 7/2013 | Krivopaltsev et al. | |
| 2013/0246125 A1 | 9/2013 | DiGioacchino et al. | |
| 2013/0297448 A1 | 11/2013 | Lester et al. | |
| 2013/0346233 A1 | 12/2013 | Caralis et al. | |
| 2014/0171039 A1 | 6/2014 | Bjontegard | |
| 2014/0207582 A1* | 7/2014 | Flinn | G06Q 30/0267 |
| | | | 705/14.66 |
| 2015/0046083 A1* | 2/2015 | Maitra | H04L 67/12 |
| | | | 701/465 |
| 2015/0051948 A1* | 2/2015 | Aizono | G06Q 30/0204 |
| | | | 705/7.29 |
| 2015/0073693 A1* | 3/2015 | Yang | G06N 5/02 |
| | | | 701/300 |
| 2015/0106366 A1 | 4/2015 | Stuttle et al. | |
| 2015/0220814 A1 | 8/2015 | Verkasalo et al. | |
| 2015/0262430 A1* | 9/2015 | Farrelly | G06Q 30/0284 |
| | | | 705/13 |
| 2015/0294223 A1* | 10/2015 | Brown | G06N 20/00 |
| | | | 706/46 |
| 2016/0026936 A1 | 1/2016 | Richardson et al. | |
| 2016/0117651 A1 | 4/2016 | Davis | |
| 2016/0117665 A1 | 4/2016 | Davis | |
| 2016/0117666 A1 | 4/2016 | Davis et al. | |
| 2016/0117670 A1 | 4/2016 | Davis | |
| 2016/0180316 A1 | 6/2016 | Wang et al. | |
| 2016/0231129 A1* | 8/2016 | Erez | G06Q 10/025 |
| 2016/0371547 A1* | 12/2016 | Valentino, III | G06K 9/00771 |
| 2017/0111462 A1 | 4/2017 | Oberli et al. | |
| 2017/0270422 A1* | 9/2017 | Sorakado | G06Q 30/02 |
| 2018/0122228 A1* | 5/2018 | Holleczek | H04W 4/029 |

FOREIGN PATENT DOCUMENTS

| | | |
|---|---|---|
| RU | 2628127 C2 | 8/2017 |
| WO | WO-2004051580 A1 | 6/2004 |
| WO | WO-2011067675 A2 | 6/2011 |
| WO | WO-2015056269 A1 | 4/2015 |
| WO | WO-2017152096 | 9/2017 |

OTHER PUBLICATIONS

Kiri Wagstaff, Claire Cardie, Seth Rogers, Stefan Schroedl, "Constrained K-means Clustering with Background Knowledge", DaimlerChrysler Research and Technology Center, Proceedings of the eighteenth international conference on machine learning, Jun. 2001, pp. 577-584 (Year: 2001).*

Maciej Krawczak, Grazyna Szkatula, "An approach to dimensionality reduction in time series", Information Sciences 260(2014) pp. 15-36. (Year: 2014).*

Ma, Xiaolei, et al., "Mining smart card data for transit riders' travel patterns". Transportation Research Part C: Emerging Technologies vol. 36, Nov. 2013, pp. 1-12 (Year: 2013).*

B. Zheng, K. Zheng, M. A. Sharaf, X. Zhou and S. Sadiq, "Efficient Retrieval of Top-K Most Similar Users from Travel Smart Card Data," 2014 IEEE 15th International Conference on Mobile Data Management, 2014, pp. 259-268, doi: 10.1109/MDM.2014.38. (Year: 2014).*

International Search Report and Written Opinion issued by the U.S. Patent and Trademark Office as International Searching Authority in International Application No. PCT/US2017/020733, dated May 11, 2017, (8 pages).

Katsaros, D. et al., "Prediction in Wireless Networks by Markov Chains", https://pdfs.semanticscholar.org/7644/9c96197d1a0758347ec7d5e04467f4ca2f8c.pdf, accessed Sep. 26, 2017, IEEE Wireless Communications, vol. 16, Issue 2, Apr. 2009 (11 pages).

European Extended Search report issued in EP17760925.2, dated Sep. 4, 2019 (9 pages).

European Extended Search Report issued in EP16858191.6, dated Jul. 24, 2019 (10 pages).

International Search Report and Written Opinion issued by U.S. Patent and Trademark Office as Searching Authority in International Application No. PCT/US16/57846, dated Jan. 17, 2017 (9 pages).

International Search Report and Written Opinion issued by the U.S. Patent and Trademark Office as Searching Authority, issued in International Application No. PCT/US16/59328, dated Jan. 3, 2017 (8 pages).

European Extended Search Report issued in EP22186784.9, dated Nov. 15, 2022 (10 pages).

* cited by examiner

SYSTEMS AND METHODS FOR PREDICTING USER BEHAVIOR BASED ON LOCATION DATA

CROSS REFERENCE TO RELATED APPLICATIONS

This application claims priority to U.S. Provisional Application No. 62/303,909, filed Mar. 4, 2016, which is incorporated herein by reference.

TECHNICAL FIELD

Embodiments of the present invention generally relate to analyzing user location data, and, in particular, to predicting user behavior based on location data.

BACKGROUND

The global network of people and machines includes millions of users of the Internet and individuals with a mobile phone. The shift toward individuals generating more and more data each day—through social media, e-commerce, remote workplaces, GPS location services, and distance learning, to name but a few—has made available a wealth of data that describes users' location and behavior. While prior efforts to analyze this data include predicting a user's location, (e.g., Katsaros and Manolopoulos, *Prediction in Wireless Networks by Markov Chains*, available at http://delab.csd.auth.gr/papers/IEEEWComm09km.pdf), the prior efforts have been met with limited success in accurately predicting a user's behavior for several reasons, one of which is that prior efforts tackle the prediction problem with shallow models considering just one dimension: the user location as the only feature.

SUMMARY OF THE INVENTION

Aspects of the present disclosure relate to systems and computerized methods for determining patterns in user activity thereby providing the user contextual information based on the patterns. In some embodiments, a computing device receives historic data associated with a first user, the historic data including at least one of historic measured time-stamped location data associated with the first user, and historic inferred time-stamped location data associated with the first data user. In some embodiments, a computing device determines entity information based on the historic data, the entity information including information about user activity occurring within historic recurring time periods, the information about the user activity including at least one of a type of user activity, a time associated with the user activity, and a likelihood of the user activity occurring with the historic recurring time periods. In some embodiments, the computing device receives current location data associated with the first user, the current location data being received after the historic data, the current location data including current measured time-stamped location data associated with the first user, and current inferred time-stamped location data associated with the first data user. In some embodiments, the computing device generates prediction information based on a combination of the entity information and the current location data for a current time period, the prediction information including at least one of an assignment of a higher confidence level associated with a type of user activity occurring within at least one of the current time period and a future time period that also occurred in at least one of the historic recurring time periods, and an indication of a new type of user activity in at least one of the current time period and a future time period. In some embodiments, the computing device determines contextual insight information based on a combination of the prediction information with at least one of the current location data, real time data, and contextual data, the contextual insight information including a recommendation of at least one of an activity, a purchase, and an accessory associated with at least one of the current location of the first user and a future location of the first user, and wherein the real time data includes a condition associated with at least one of the current location of the first user and the future location of the first user, and the contextual data is associated with an interaction between the first user and a first user device.

In some embodiments, determining entity information further comprises determining, by a computing device, a similarity score for a first user activity occurring within the recurring historic time periods based on at least one of the historic data associated with the first user and historic data associated with a second user, the similarity score associated with an amount of similarity between the first user activity during a first and second historic time period of the recurring historic time periods, and aggregating, by the computing device, at least the first user activity with a second user activity based on a threshold number of times the first user activity and second user activity occur within the same recurring historic time periods.

In some embodiments, the systems and methods described herein further include transforming, by a computing device, the received historic data into at least one of time series data including at least one of time spent at home, time spent at work, a distance from home over time, a distance from work over time, categorical data including at least one of a visit to a restaurant, a visit to a park, a weather condition, numerical data including at least one of a number of different places visited and an outside temperature, and Boolean data.

The historic measured time-stamped location data and the current measured time-stamped location data are associated with data collected by a location tracking device, and the historic inferred time-stamped location data and the current inferred time-stamped location data include at least one of a user transaction, a manual check-in by the first user, a distance from a timed location point to a location associated with at least one of the historic inferred time-stamped location data and the current inferred time-stamped location data, and weather information associated with at least one of the historic inferred time-stamped location data and the current inferred time-stamped location data. In some embodiments, the condition associated with at least one of the current location of the first user and the future location of the first user includes at least one of weather, a traffic pattern, a train schedule, and a restaurant proximity and availability, presence of a second user, time since a prior visit to the current location, and news events, and the interaction between the first user and a first user device includes a number of push notifications accessed by the first user on the first user device.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Embodiments of the present disclosure relate to recognizing underlying structure in users' daily movements that can be detected and classified, and evaluating a user's historical data to surface the underlying structure in his/her daily movements. These entities can then be used to predict the user's future movements. The ability to predict a user's geospatial movements has a broad range of applications, ranging from the ability to provide just-in-time contextual information (e.g., traffic information or travel recommendations if the user is going to the airport; weather information if the user is headed to her weekend cottage) to marketing opportunities (discounted restaurant meals if the user is going to work late).

In some embodiments, systems and methods described herein use location data and other contextual information to cluster user days according to behavioral patterns (e.g. a day at the office, going to the country house for a long weekend, etc.). The "prediction module" can then analyze real-time data about a user and make a behavioral prediction based on the detected patterns. In some embodiments, the module is highly adaptive, and can adjust its prediction as new information becomes available.

Various techniques can be used to gather user information and to create a derived social network, for example, as described in FIGS. 1 and 2 below. Additionally, systems and methods for gathering user information to create and to modify a derived social network are described in more detail in U.S. application Ser. No. 15/298,353, titled "System and Method for Detecting Interaction and Influence in Networks," filed Oct. 20, 2016, the contents of which are incorporated herein.

Figure 1:
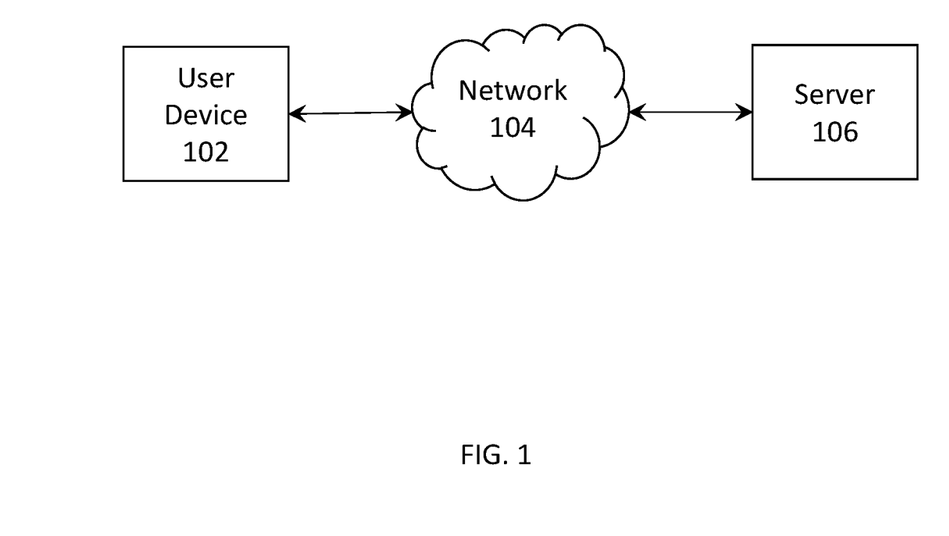
FIG. 1 is a system diagram showing a networked system, according to some embodiments of the present disclosure.

FIG. 1 is a system diagram showing a networked system 100, according to some embodiments of the present disclosure. FIG. 1 shows a user device 102, network 104, and server 106.

A user device 102 can be associated with a user participating in the location tracking systems and methods described herein and can collect information from users participating in the networked system. In some embodiments, the user device 102 can include any computerized device capable of recording and transmitting information about a user's proximity to another user or to a location. In some embodiments, the computerized device can include a smart phone, tablet, computer, laptop, car, or smart watch that can be installed with a mobile application that facilitates the gathering of data.

In some embodiments, the user device 102 can include vehicle-mounted data collection agents such auto onboard diagnostics modules, telemetrics and telematics modules, transponders, onboard GPS modules, and other systems that collect relevant data.

In some embodiments, user device 102 can include consumer wearable devices or fitness monitors such as the Jawbone Up, Fitbit Charge, or Apple Watch devices.

In some embodiments, data can be transmitted directly from user device 102 to network 104 (e.g., in the case of the mobile application) or can be collected through an intermediate step. For example, in the case of a vehicle telemetrics system, an intermediate module may be utilized to gather information from the onboard device and transmit it over a wireless link to a smartphone where it may then be transmitted to network 104.

In some embodiments, a mobile application can be installed on a user's smartphone computing device and provide the user with the ability to opt-in to various data collection mechanisms. For example, a user can permit the system described herein, via the mobile app, to gather the user's contacts, Facebook friends, Instagram friends, position data over time, and payments made using the smartphone computing device, telephone and messaging patterns.

In some embodiments, a user device 102 can take the form of an application or applets that is provided with various connected devices. For example, an app embedded in a DVR can transmit data concerning viewing habits and preferences, while software embedded in a car's navigation system can transmit data concerning position and driving patterns.

It will be appreciated by those of skill in the art that there is no limit to the type and variety of user devices that can be utilized with systems described in the present disclosure.

Network 104 enables communication between the user device 102. Network 104 can be public network such as the Internet, with each of the user device 102 and server 104 connected via a gateway using communication protocols such as Wi-Fi, Ethernet and 4G wireless. Alternatively, network 104 can be a closed network such as a local area network (LAN) with the various components of the relationship analytics system not accessible on the open Internet. In some embodiments, communications via network 104 can be encrypted, or additional security protocols me be utilized such as virtual private network (VPN) or secure socket shell (SSH) tunneling.

Server 106 can include one or more server computers implementing a database for holding the data gathered about the user. In some embodiments, a particular configuration of server 106 can depend on a number of factors such as the type of database, the anticipated size of the database, and user performance expectations. In some embodiments, the system is scalable and additional processing capacity can be added as demand increases. Server 106 can also include a processor for executing software configured to process the user data. For example, and as described in more detail, the server can be configured to analyze user data to predict user behavior.

Figure 2:
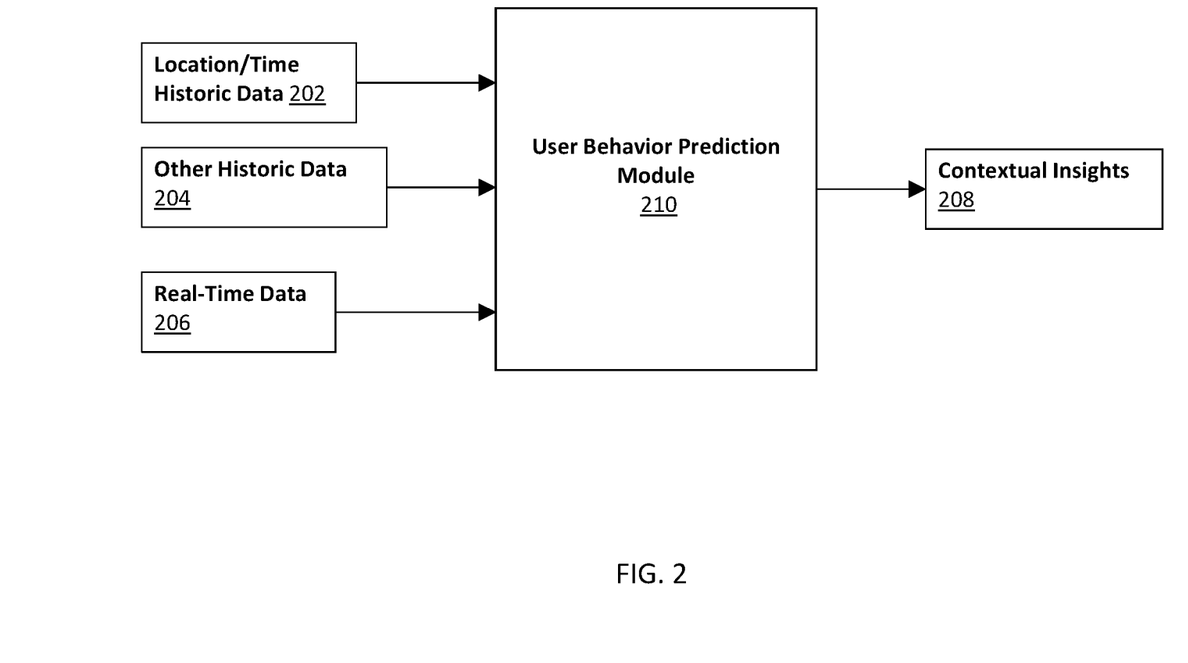
FIG. 2 is a diagram showing a user behavior prediction module, according to some embodiments of the present disclosure.

FIG. 2 is a diagram showing a user behavior prediction module, according to some embodiments of the present disclosure. FIG. 2 shows location/time historic data 202, other historic data 205, real-time data 206, contextual insights 208, and user behavior prediction module 210.

Location/time historic data 202 and other historic data 204, together with real-time data 206 are the inputs of the user behavior prediction module 210. Location/time historic data 202 refers to time-stamped location data associated with a user over a period of time prior to a current time. The time-stamped location data can be received via a user device capable of measuring location and associating a user's location with a point in time the location was measured (e.g., GPS). Other historic data 204 (also referred to herein as inferred historic data) can include user transactions, manual check-ins by users at locations, or any other characteristic associated with a user that can be correlated with a user's location that is collected at a time (or over a period of time) prior to a current time. Real time data 206 is data associated with a user that is measured at a current time. Real time data 206 can include similar types of data as location/time historic data 202 and other historic data 204.

As described in more detail below, user behavior prediction module processes location/time historic data 202, other historic data 204, and real time data 206 to form contextual insights 208. Contextual insights 208 can include auxiliary information based on the user's current location or predicted next location(s). In some embodiments, auxiliary data includes a recommendation of at least one of an activity, a purchase, and an accessory. For example, when user prediction module 210 predicts the user is going to his country house for a weekend out of town, it can suggest appropriate clothes based on weather prediction at destination.

In some embodiments, user behavior prediction module 210 is implemented in server 106. User behavior prediction module 210 can send contextual insights 208 to a user device 102 through network 104. User behavior prediction module 210 can also receive location/time historic data 202, other historic data 204 and real-time data 206 from user device 102 through network 104.

Figure 3:
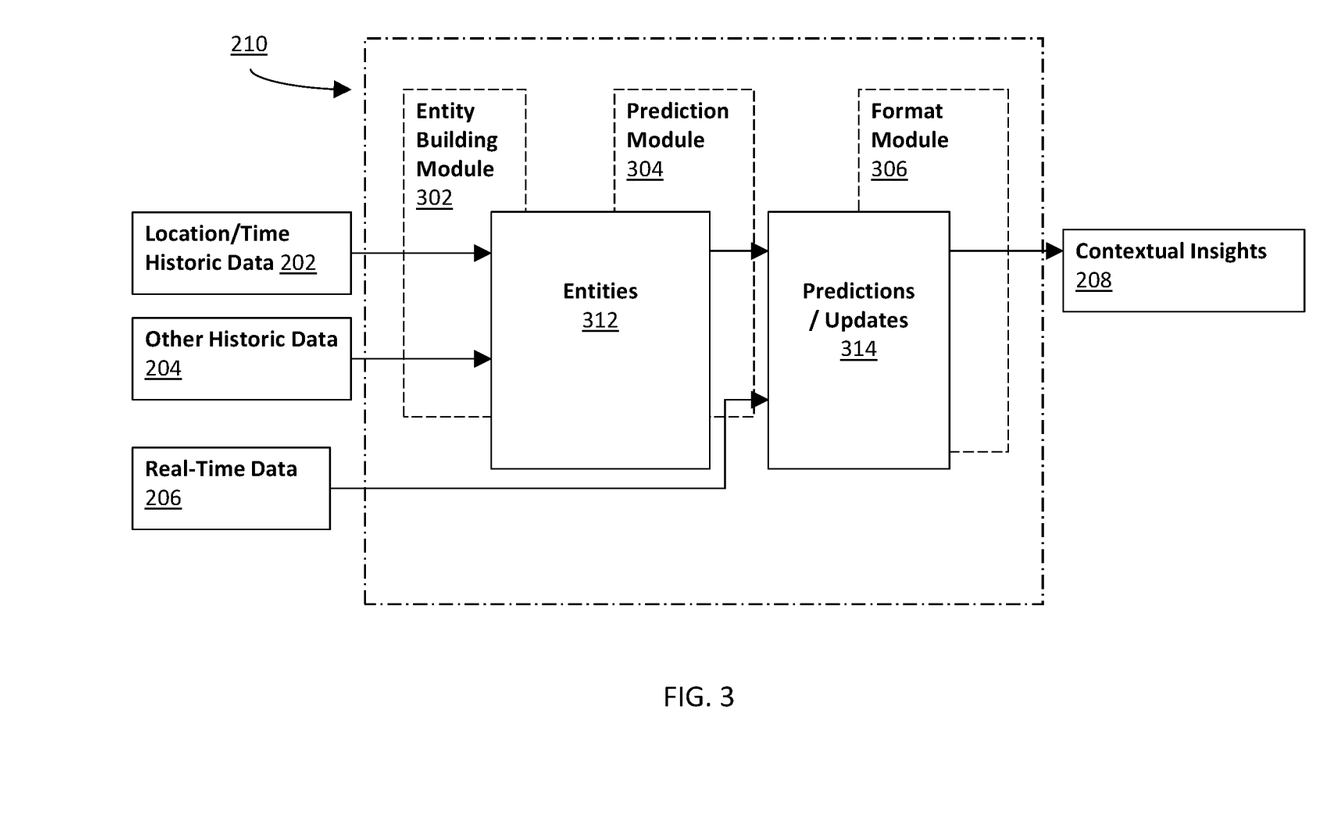
FIG. 3 is a diagram showing a user prediction module, according to some embodiments of the present disclosure.

FIG. 3 is a diagram showing a user prediction module 210, according to some embodiments of the present disclosure. The user prediction module includes entity building module 302, prediction module 304, and format module 306.

Building module 302 can analyze the past behavior of the user, cluster the user's daily habits according to behavioral patterns, and store detected entities 312 for future uses. Entities 312 are abstract representations of types of days (or other time periods) experienced by a user. When user days are clustered together, important day types, or entities, become apparent. For example, "work+gym day" can emerge as an entity for a user who regularly engages in both activities on a day, or for regular travelers, "travel" or "out of town" days might emerge as entities.

Prediction module 304 can use real-time data 206 and entities 312 from entity building module 302 to predict user current behavior. As described in more detail below in the text accompanying FIG. 5, in some embodiments, prediction module 304 can work in a loop, constantly providing predictions and updates to predictions 314 with new data if a confidence level associated with a prediction is not high enough or if user behavior unexpectedly deviates from the patterns. As the day progresses, predictions 314 can be made, by (1) matching the user day to a specific entity with increasing certainty, which then (2) guides predictions as to behaviors likely to come later in the day. For example, consider a user who often has days where she goes to the gym, then to work, then out for supper; this type of day might become an entity for her. If, on a particular day, the user starts out at the gym, it can be predicted that the user will go out for supper that night. If the user then goes to work after the gym, there may be even a higher level of confidence that she will go out for supper. But if the user diverges from the entity, e.g., not going to work, there may be less confidence that she will go out for supper later. Another type of prediction allowed by entity assignment is at the entity level; e.g., if a user typically works four days on and four days off, then occurrence of the fourth workday entity in a row predicts that the next day will not be a work day. Similarly, if one day is a travel day, the next day might be more likely to be an "away from home" type entity.

Format module 306 can take the predictions/updates 314 of module 304 and, together with other variables and contextual info associated with real-time data 206, decide whether/how to deliver contextual insights 208. As described in more detail below in the text accompanying FIG. 6, contextual insights 208 can refer to providing useful information, e.g., if it is predicted that a user will stop for coffee (or take a train), the system can provide a cafe suggestion (or information about a train platform change). However, if the system determines that a user has ignored the past offers of assistance, e.g., at this time of day, the system can choose to ignore the information and not display it.

Figure 4:
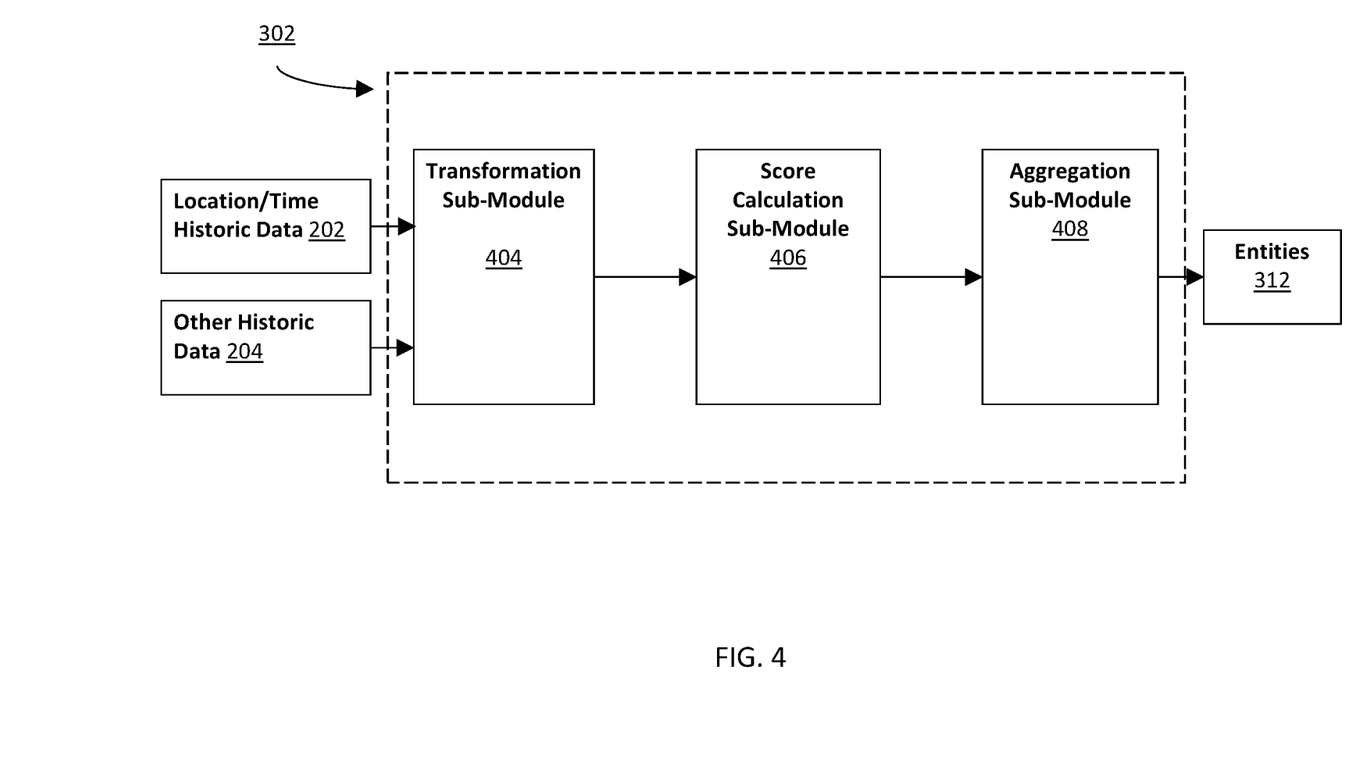
FIG. 4 is a diagram showing an entity building module, according to some embodiments of the present disclosure.

FIG. 4 is a diagram showing an entity building module 302, according to some embodiments of the present disclosure. FIG. 4 shows entity building module including transformation sub-module 404, score calculation sub-module 406, and aggregation sub-module 408.

Transformation sub-module 404 can accept as inputs historic user data in the form of a timed location point 202 and, when available, any additional data source deemed useful 204, such as the user's past and present significant places (e.g., home, work, vacation home locations), and distances from a timed location point to each of those places, historical weather patterns, etc. Transformation sub-module 404 can surface the key patterns that summarize one or many individuals (or users). Location data/points 202 as used herein can be anything that helps to or assigns a user to a position, generally using latitude and longitude but also includes observations from which a position can be inferred exactly (e.g. at restaurant X, by this specific monument, etc.), relatively (e.g. next to user Y), or partially (e.g. on a train, eating tacos, etc.). The transformation is akin to a dimensionality reduction process, in that it turns a large amount of location points into a few key parameters that contain the valuable information, but in a way that is tailored to each user individually and preserves meaning as well as interpretability.

For example, user data in the form of locations with timestamps can be transformed into various features, including but not limited to time series data (e.g. time spent at home/work/other, distance from home/work over time, etc.), categorical data (e.g. visited a restaurant, a park, weather was sunny, etc.), numerical data (e.g. number of different places visited, outside temperature, etc.), and Boolean data (e.g. a value providing a yes or no answer, for example whether user is in another country or at home). In some embodiments, Boolean data can be generated by the systems and methods described herein. In some embodiments, a query can be sent to users, and their answers recorded as Boolean data. Elements are defined as the single units of entities (e.g. the days of a user's schedule) and features a split accordingly into the elements they belong to. Features allow elements to be compared with others to quantify their (dis)similarity. In some embodiments, the elements can be pre-determined set for the entire analysis (e.g., cafe visits, train travel, etc.). However, how elements combine and cluster can be unique to the user. That is, some specific elements can be utterly random for some users, and not offer any structure, e.g., cafe visits, but for other users the same elements can emerge as primary differences between clusters.

After the history of user location points is turned into elements, score calculation module 406 measures the similarity between specified time periods (e.g., days or half-days or other non-24 hour periods) using the extracted features. Since features have various types or structures and can represent conceptually different properties, different scorers can be built for different tasks. In some embodiments, each scorer is designed with a specific purpose or to capture a specific aspect of the elements, e.g. how similar are activities over two days (entities) in terms of: scorer 1—home-work commute times, scorer 2—trajectory on the map, scorer 3—type of venues visited, etc. Since each scorer is optimized for a specific task, scores can be aggregated into an overall measure of similarity between two elements.

Aggregation sub-module 408 can cluster entities into coherent groups of similar entities using the similarity scores calculated using score calculation sub-module 406. Unsupervised learning algorithms learn structure from data without labels. Unsupervised clustering is a type of unsupervised learning algorithm where the algorithm devises a structure to group similar types of instances together, without knowing a priori which instances belong together. Aggregation sub-module 408 can utilize unsupervised learning algorithms that clusters similar elements together and surfaces an entity that summarizes the elements within that cluster and highlight what defines it and distinguishes it from other groups of elements. This process is generalizable to any entity, including multiple users and non-24 hours periods. The resulting entities 312 can be represented and visualized in custom profiles for each user and provide considerable values in understanding his/her behavioral patterns even when these insights are not being used by the prediction module 304 (as explained below). For example, one type of activity can be clustered with another type of activity if the occurrence of the two activities exceeds a threshold number of times within a time period.

Figure 5:
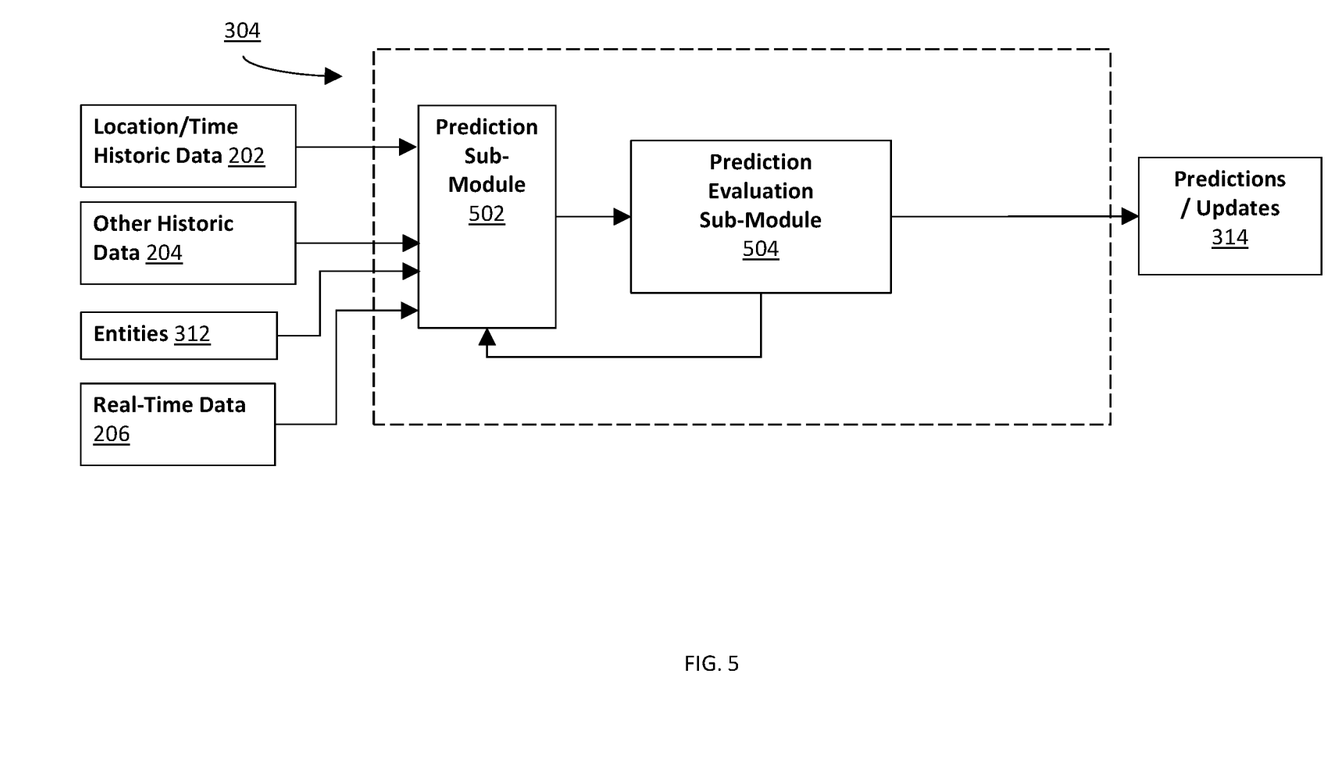
FIG. 5 is a diagram showing a prediction module, according to some embodiments of the present disclosure.

FIG. 5 is a diagram showing a prediction module, according to some embodiments of the present disclosure. FIG. 5 shows prediction sub-module 502, prediction evaluation sub-module 504, and update sub-module 506.

Entities (as described above, which can refer to abstract summaries of a user's behavior over a set period of time, e.g., days) 312, historic data 202 204, and real-time data 206 are input into prediction sub-module 502 to establish an initial prediction (e.g. using machine learning algorithms). For example, as a user's day develops, the behavior documented so far that day can be compared to the user's known day entities, and the proto-day would be initially classified as belonging to the entity it is closest to. Cosine similarity is an example of a similarity measure that can be used to reveal the similarity between vectorized entities to identify the most similar entity (or to determine that the new day is not similar to any of the existing entities and can be labeled an outlier).

The output of prediction sub-module 502 can then be re-evaluated through the prediction evaluation sub-module 504. Prediction evaluation sub-module 504 evaluates a prediction for its goodness, e.g., confidence is compared against a pre-set threshold. If the prediction is good enough, it can be output as a prediction 314. If the prediction is not good enough, the prediction is cycled back through a new prediction process when there is more data.

In some embodiments, data is continuously re-updated until a single entity prediction 314, which is associated with a sufficient confidence level, is output. As the user's day (or time frame across which the entities are calculated) wears on, the prediction can be re-evaluated including the previous and the new information. This process is identical to the initial prediction, with the inclusion of more information. This process can be especially valuable if only a small amount of information was used in the initial prediction.

In some embodiments, the aim of the prediction module 304 is to confirm as early as possible the definitive entity a user belongs to (e.g. which day plan the user will follow later today). In that regard, prediction module 304 looks for features that tip off the user's intent as early as possible (e.g. real-time data 206, such as morning commute by train instead of car might indicate user going to airport rather than work). The confidence in the prediction is evaluated and a decision is made as to either confirm it, or return to prediction stage and wait for more real-time data so the prediction can be updated. Once a day plan is confirmed the associated predictions 314 are then surfaced (e.g. home/work commute times, type of venues visited, mode of transportation used, going abroad, etc.) for consumption by the format module 306. In some embodiments, if the user's behavior is different from anything seen previously, the user behavior can be labeled as an outlier.

Figure 6:
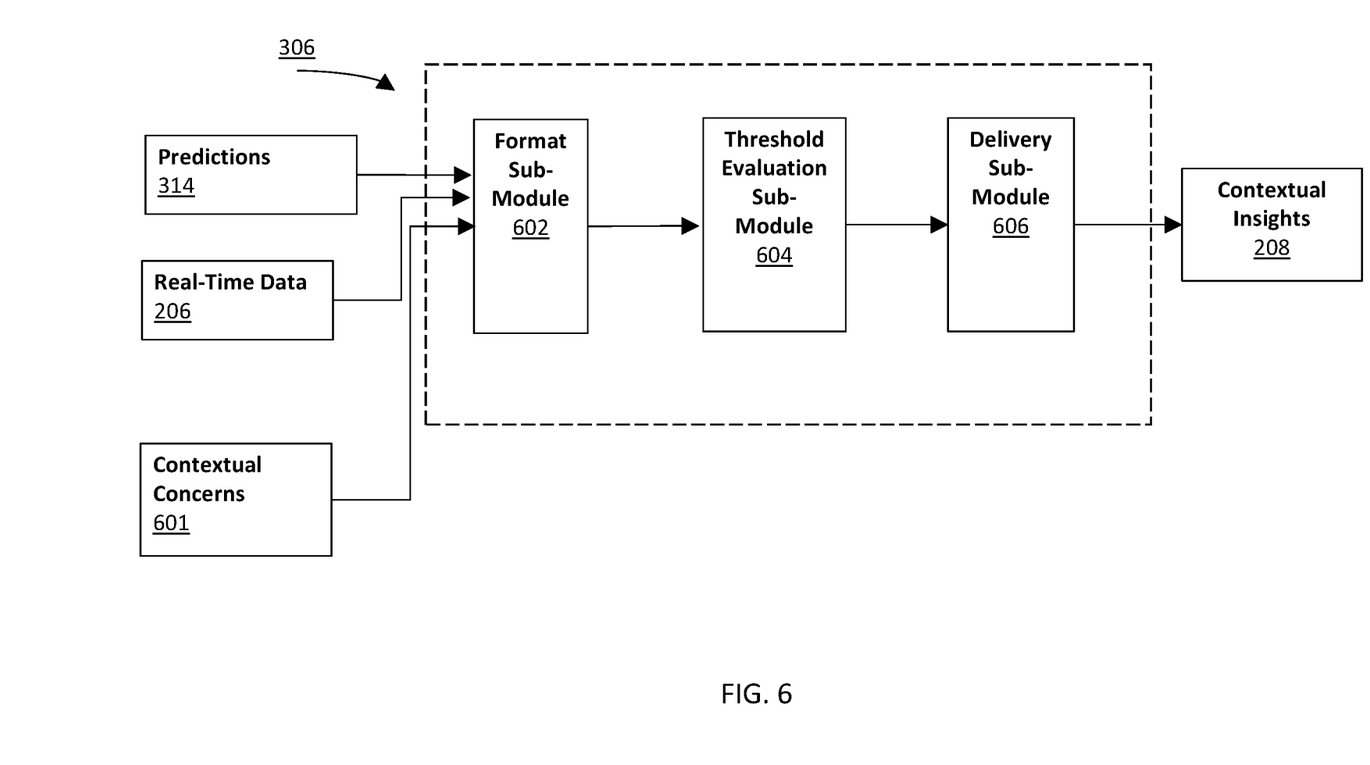
FIG. 6 is a diagram showing format module, according to some embodiments of the present disclosure.

FIG. 6 is a diagram showing format module, according to some embodiments of the present disclosure. FIG. 6 shows contextual concerns 601, format sub-module 602, threshold evaluation sub-module 604, and delivery sub-module 606.

Format module 306 evaluates predictions 314 in the context of real-time data 206 and contextual information 601 (e.g., the users' recent interactions with the app), and makes available the results of the evaluation for recommendations and dashboard display.

Format sub-module 601 combines the information from predictions 314, real-time data 206, and contextual concerns 601. The predictions 314 are considered with real time data 206 (e.g., weather, traffic patterns, train schedules, merchant location and availability, presence of other users, time since last visit, category, features, etc.) and contextual concerns 601 specific to a situation (e.g., the number of push messages already sent to the user that day). This data is combined in a predictive model that determines whether or not the contextual insights should be delivered to the user. As an example, and as described in more detail below, logistic regression can be used to combine the respective predictive elements with appropriate weights to describe the likely categorical outcome (e.g., would the user interact with a push notification). For example, if the prediction is that the user will stop in a cafe, the system can recommend an appropriate one. However, if it is raining and all the cafes are open-air, the recommendation would not be appropriate to send. Similarly, if a user has dismissed all push notifications immediately without reading them within a period of time, the system can determine not to send another one at a time subsequent to the period of time.

The output of the format sub-module 602 is input into threshold evaluation sub-module 604, which evaluates the output against a threshold to filter for predictions 314 with low level of appropriateness in the current context. For example, the system can evaluate whether a user should be sent a push notification given that they are not very likely to interact with one. The threshold for sending such a notification might be lower in situations where the stakes are higher (e.g., warning the user that their flight has been canceled or there is an accident on the highway) but higher for less immediately important information. Delivery submodule 606 then formats the predictions 314 to address specific use cases (e.g., is the user late for work?) which result in contextual insights 208. The use cases can be either specific questions or automatically surfaced insights.

Figure 7:
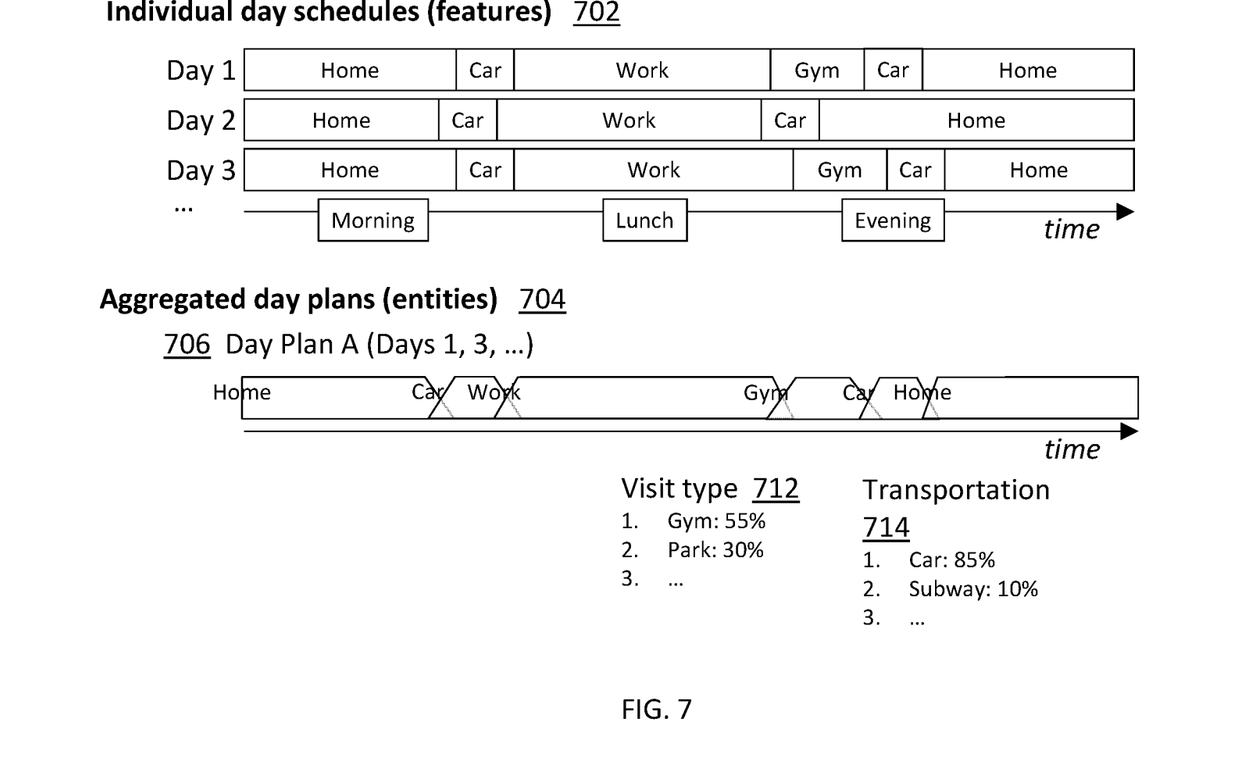
FIG. 7 is a diagram showing an example of creating entities, according to some embodiments of the present disclosure.

FIG. 7 is a diagram showing an example of creating entities, according to some embodiments of the present disclosure. The type of entity shown in FIG. 7 is a day plan.

Using the structures of features and elements introduced in FIG. 4, a user's schedule can be recreated and broken down on a day-by-day basis 702 with each day of a user being an element and the schedule being one feature. Through entity building module 302, similar days can be aggregated into a group where key aspects are surfaced 704: For example, a proto-typical "working day" 706 for the user, in this example, is a commute to work by car, a working day at the office, a gym stop after work and an evening at home. This allows for similar yet non identical days to be grouped together and have their commonalities surfaced. As described above, the common information can be used, for example, to automatically build user profiles or to inform real-time predictions. Visit type 712 and transportation 714 are examples of elements that, through clustering, can define entities (e.g., day plan A is defined by taking the car as the mode of transportation while both day plans A and B involve spending time at work).

Figure 8:
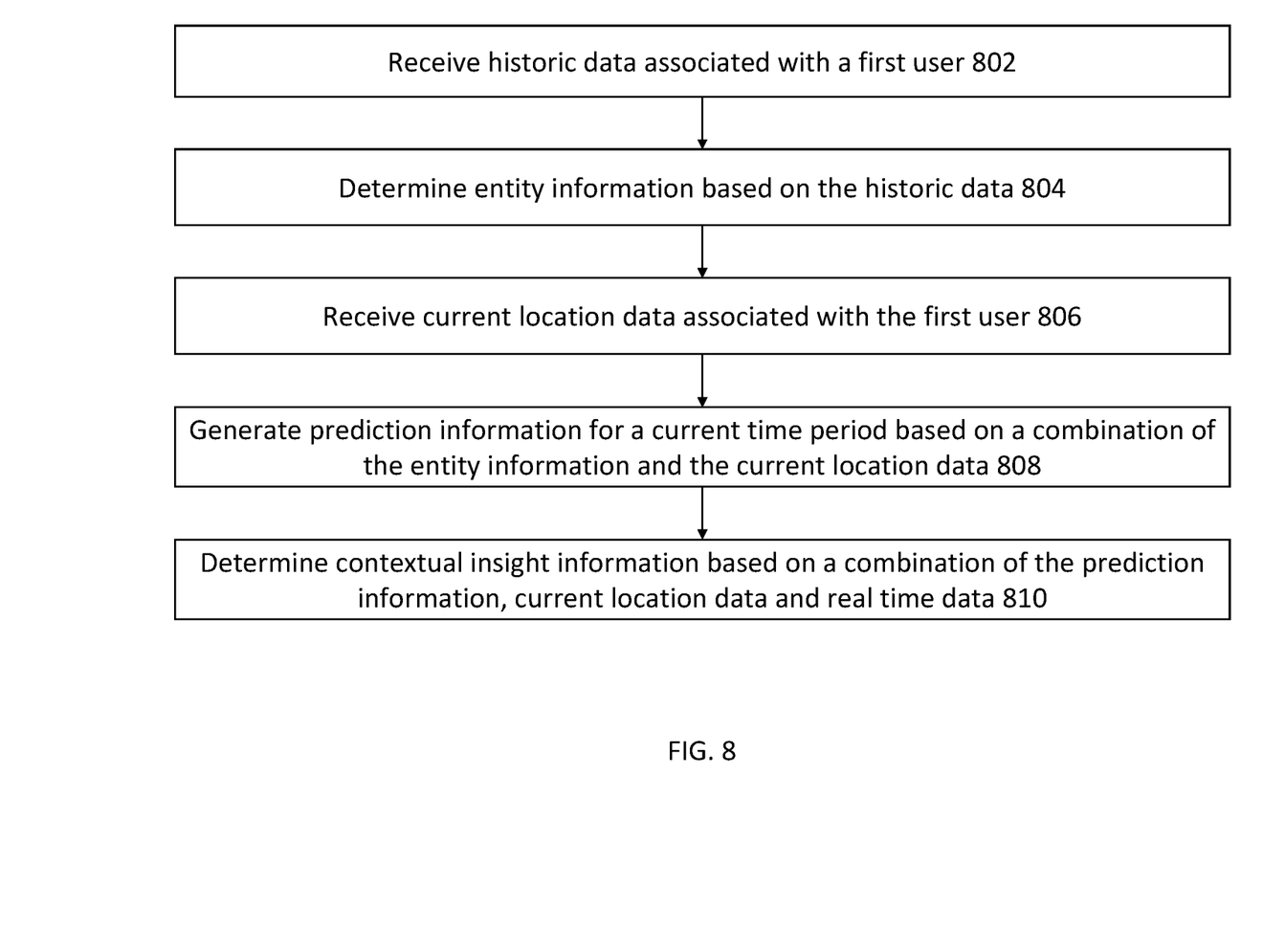
FIG. 8 is a flowchart showing a process of providing contextual information to a user based on determining patterns in user activity, according to some embodiments of the present disclosure.

FIG. 8 is a flowchart showing a process of providing contextual information to a user based on determining patterns in user activity, according to some embodiments of the present disclosure.

Referring to step 802, historic data associated with a first user is received. In some embodiments, the historic data includes historic measured time-stamped location data associated with the first user and historic inferred time-stamped location data associated with the first data user. As described above, historic measured time-stamped location data can include location and time information received from a user over a time period. For example, historic measured time-stamped data can include a time-stamped set of GPS coordinates associated with a user over a time period. Historic inferred time-stamped location data also includes location and time information received from a user over a time period. Inferred location data refers to location data not measured using a location tracking device (e.g., GPS). For example, an inferred location point can include a purchase at a store or a social connection tagging a user at a particular location. Both the historic measured time-stamped location data and the historic inferred time-stamped location data can be stored in a database of server 106.

Referring to step 804, entity information based on the historic data is determined. In some embodiments, the entity information includes information about user activity occurring within a historic recurring time period. As described above, a historic recurring time period can include a duration of time is cyclical (e.g., a day, every four hours). Information about the user activity can include least one of a type of user activity, a time associated with the user activity, and a likelihood of the user activity occurring with the historic recurring time period.

Referring to step 806, current location data associated with the first user is received. In some embodiments, current location data refers to data received after the historic data. A time period for evaluating current location data can be set to either a predetermined time or a time corresponding to a threshold for collecting enough data to generate prediction information. In some embodiments, the current location data includes current measured time-stamped location data associated with the first user and current inferred time-stamped location data associated with the first data user. The measured and inferred time-stamped location data associated with the current time period is obtained in a similar fashion as the measured and inferred time-stamped location data associated with the historic time period.

Referring to step 808, prediction information for a current time period is generated based on a combination of the entity information and the current location data. In some embodiments, the current time period is similar to the historic recurring time period. For example, if the historic recurring time period is one day, then the current historic recurring time period is one day. In some embodiments, the current time period can differ from the historic recurring time period. In some embodiments, the prediction information includes least one of an assignment of a higher confidence level associated with a type of user activity occurring within the current time period or a future time period that also occurred in the historic recurring time period, and an indication of a new type of user activity in the current time period or in a future time period. For example, historic entity information can include a day that includes the following activities: home-work-gym-work-dinner out-home. Prediction information for a current day where the user went from home to work, to the gym, and back to work can include a higher confidence level that the user will have dinner out. Prediction information for a current day where the user went from home to work, to the gym, and back to work, and then noted that the user's location is near a saved friend's location can include a new type of activity associated with the friend's location (e.g., eating dinner at the friend's house). Prediction information can also include future activities. For example, detecting that a user has purchased airline tickets to a particular location at a particular time, and potentially combined with news events, weather, a user's social network, or other information associated with the future location, can be used to predict a future user activity (e.g., user with travel plans to a country where a friend resides plus a certain number of correspondences between the user and the friend can indicate the likelihood that the user will visit the relative's house).

Referring to step 810, contextual insight information is determined based on a combination of the prediction information with at least one of the current location data, real time data, and contextual data. As described above, the contextual insight information can include auxiliary data associated with the current location of the first user. The auxiliary data can include a recommendation of at least one of an activity, a purchase, and an accessor associated with the current location and/or a future location. For example, the auxiliary data can include appropriate clothes to bring based on weather for a predicted trip for the user. Another example can include relevant coffee shops for a predicted afternoon outing with a friend. In some embodiments, the real time data includes a condition associated with a current location of the first user. As described above, a condition can include real time data indicating, for example, the weather at a current or predicted location or the proximity of a train to a predicted location. The contextual data can be associated with an interaction between the first user and a first user device. For example, the contextual data can include, for example, the number of push messages already sent to the user that day.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computerized method comprising:
receiving, by a computing device, historic time-stamped location data associated with a first user, the historic time-stamped location data having a first dimensionality;
transforming, by the computing device, the historic time-stamped location data into a set of extracted features having a second dimensionality less than the first dimensionality, wherein the set of extracted features includes one or more of time series data, categorical data, numerical data, or Boolean data;
determining, by the computing device, entity information for each of a plurality of entities based on the set of extracted features, the entity information including a likelihood of the first user taking a train within historic recurring time periods;
assigning, by the computing device, a plurality of scores to each pair of entities among the plurality of entities, the plurality of scores measuring a plurality of types of similarities between the pair of entities, the plurality of types of similarities including one or more of a commute time similarity, a map trajectory similarity, or a venue type similarity;

clustering, by the computing device, using unsupervised machine learning, the plurality of entities into one or more clusters of entities based on the plurality of scores;

generating, by the computing device, using unsupervised machine learning, summary information for each of the one or more clusters based on the entity information;

receiving, by the computing device, current location data associated with the first user, the current location data being received after the historic time-stamped location data, the current location data including:
   current measured time-stamped location data associated with the first user,
   current inferred time-stamped location data associated with the first data user,
   a current mode of transportation of the first user, and
   a current location of the train;

generating, by the computing device, initial prediction information based on a combination of the summary information, the current location data, and the current mode of transportation of the first user, the initial prediction information including an assignment of an initial confidence level associated with a user taking the train later in a current day;

determining, by the computing device, initial contextual insight information based on a combination of the initial prediction information, the current location data, and the current location of the train, the initial contextual insight information including weather information associated with taking the train later in the current day;

automatically causing, by the computing device, an initial push notification to be sent to the first user device in response to generating the initial contextual insight information;

re-evaluating, by the computing device, throughout the day, the initial prediction information, yielding updated prediction information having a higher confidence level than the initial confidence level;

determining, by the computing device, updated contextual insight information based on a combination of the updated prediction information, the current location data, the current location of the train, and a contextual concern, the updated contextual insight information including a schedule change associated with the train, and wherein:
   the current location of the train identifies a proximity of the train to a future location of the first user, and
   the contextual concern includes a determination that the first user interacted with the initial push notification; and automatically causing, by the computing device, an updated push notification to be sent to the first user device in response to determining the updated contextual insight information.

2. The computerized method of claim 1, further comprising transforming, by the computing device, the historic time-stamped location data into at least one of:
   time series data including at least one of time spent at home, time spent at work, a distance from home over time, or a distance from work over time;
   categorical data including at least one of a visit to a restaurant, a visit to a park, or a weather condition;
   numerical data including at least one of a number of different places visited and an outside temperature; and
   Boolean data.

3. The computerized method of claim 1, wherein the time-stamped location data is associated with data collected by a location tracking device, and the time-stamped location data include at least one of:
   a user transaction;
   a manual check-in by the first user;
   a distance from a timed location point to a location associated with the time-stamped location data; and
   weather information associated with the time-stamped location data.

4. A non-transitory computer readable medium having executable instructions operable to cause an apparatus to:
   receive historic time-stamped location data associated with a first user, the historic time-stamped location data having a first dimensionality;
   transform the historic time-stamped location data into a set of extracted features having a second dimensionality less than the first dimensionality, wherein the set of extracted features includes one or more of time series data, categorical data, numerical data, or Boolean data;
   determine entity information for each of a plurality of entities based on the set of extracted features, the entity information including a likelihood of the first user taking a train within historic recurring time periods;
   assign a plurality of scores to each pair of entities among the plurality of entities, the plurality of scores measuring a plurality of types of similarities between the pair of entities, the plurality of types of similarities including one or more of a commute time similarity, a map trajectory similarity, or a venue type similarity;
   cluster, using unsupervised machine learning, the plurality of entities into one or more clusters of entities based on the plurality of scores;
   generate, using unsupervised machine learning, summary information for each of the one or more clusters based on the entity information;
   receive current location data associated with the first user, the current location data being received after the historic time-stamped location data, the current location data including:
      current measured time-stamped location data associated with the first user,
      current inferred time-stamped location data associated with the first data user,
      a current mode of transportation of the first user, and
      a current location of the train;
   generate initial prediction information based on a combination of the summary information, the current location data, and the current mode of transportation of the first user, the initial prediction information including an assignment of an initial confidence level associated with a user taking the train later in a current day;
   determine initial contextual insight information based on a combination of the initial prediction information, the current location data, and the current location of the train, the initial contextual insight information including weather information associated with taking the train later in the current day;
   automatically cause an initial push notification to be sent to the first user device in response to generating the initial contextual insight information;
   re-evaluate, throughout the day, the initial prediction information, yielding updated prediction information having a higher confidence level than the initial confidence level;
   determine updated contextual insight information based on a combination of the updated prediction information, the current location data, the current location of the train, and a contextual concern, the updated contextual insight information including a schedule change associated with the train, and wherein:
the current location of the train identifies a proximity of the train to a future location of the first user, and
the contextual concern includes a determination that the first user interacted with the initial push notification; and
automatically cause an updated push notification to be sent to the first user device in response to determining the updated contextual insight information.

5. The non-transitory computer readable medium of claim 4, wherein:
the time series data includes at least one of time spent at home, time spent at work, a distance from home over time, or a distance from work over time;
the categorical data includes at least one of a visit to a restaurant, a visit to a park, or a weather condition;
the numerical data includes at least one of a number of different places visited or an outside temperature.

6. The non-transitory computer readable medium of claim 4, wherein the time-stamped location data is associated with data collected by a location tracking device, and the time-stamped location data includes at least one of:
a user transaction;
a manual check-in by the first user;
a distance from a timed location point to a location associated with the time-stamped location data; and
weather information associated with the time-stamped location data.

7. A computing device for determining patterns in user activity thereby providing the user contextual information based on the patterns, the computing device comprising:
data storage; and
a processor in communication with the data storage, and configured to run a module stored in memory that is configured to cause the processor to:
receive historic time-stamped location data associated with a first user, the historic time-stamped location data having a first dimensionality;
transform the historic time-stamped location data into a set of extracted features having a second dimensionality less than the first dimensionality, wherein the set of extracted features includes one or more of time series data, categorical data, numerical data, or Boolean data;
determine entity information for each of a plurality of entities based on the set of extracted features, the entity information including a likelihood of the first user taking a train within historic recurring time periods;
assign a plurality of scores to each pair of entities among the plurality of entities, the plurality of scores measuring a plurality of types of similarities between the pair of entities, the plurality of types of similarities including one or more of a commute time similarity, a map trajectory similarity, or a venue type similarity;
cluster, using unsupervised machine learning, the plurality of entities into one or more clusters of entities based on the plurality of scores;
generate, using unsupervised machine learning, summary information for each of the one or more clusters based on the entity information;
receive current location data associated with the first user, the current location data being received after the historic time-stamped location data, the current location data including:
current measured time-stamped location data associated with the first user,
current inferred time-stamped location data associated with the first data user,
a current mode of transportation of the first user, and
a current location of the train;
generate initial prediction information based on a combination of the summary information, the current location data, and the current mode of transportation of the first user, the initial prediction information including an assignment of an initial confidence level associated with a user taking the train later in a current day;
determine initial contextual insight information based on a combination of the initial prediction information, the current location data, and the current location of the train, the initial contextual insight information including weather information associated with taking the train later in the current day;
automatically cause an initial push notification to be sent to the first user device in response to generating the initial contextual insight information;
re-evaluate, throughout the day, the initial prediction information, yielding updated prediction information having a higher confidence level than the initial confidence level;
determine updated contextual insight information based on a combination of the updated prediction information, the current location data, the current location of the train, and a contextual concern, the updated contextual insight information including a schedule change associated with the train, and wherein:
the current location of the train identifies a proximity of the train to a future location of the first user, and
the contextual concern includes a determination that the first user interacted with the initial push notification; and
automatically cause an updated push notification to be sent to the first user device in response to determining the updated contextual insight information.

8. The computing device of claim 7, wherein:
the time series data includes at least one of time spent at home, time spent at work, a distance from home over time, or a distance from work over time;
the categorical data includes at least one of a visit to a restaurant, a visit to a park, or a weather condition; and
the numerical data includes at least one of a number of different places visited or an outside temperature.

9. The computing device of claim 7, wherein the time-stamped location data is associated with data collected by a location tracking device, and the time-stamped location data include at least one of:
a user transaction;
a manual check-in by the first user;
a distance from a timed location point to a location associated with the time-stamped location data; and
weather information associated with the time-stamped location data.

* * * * *